Dec. 29, 1931.  G. F. BISCHOF  1,838,802
SHOCK ABSORBER
Filed April 25, 1929
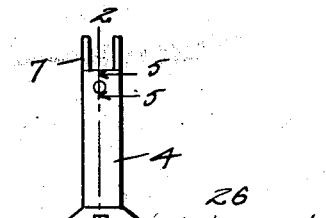
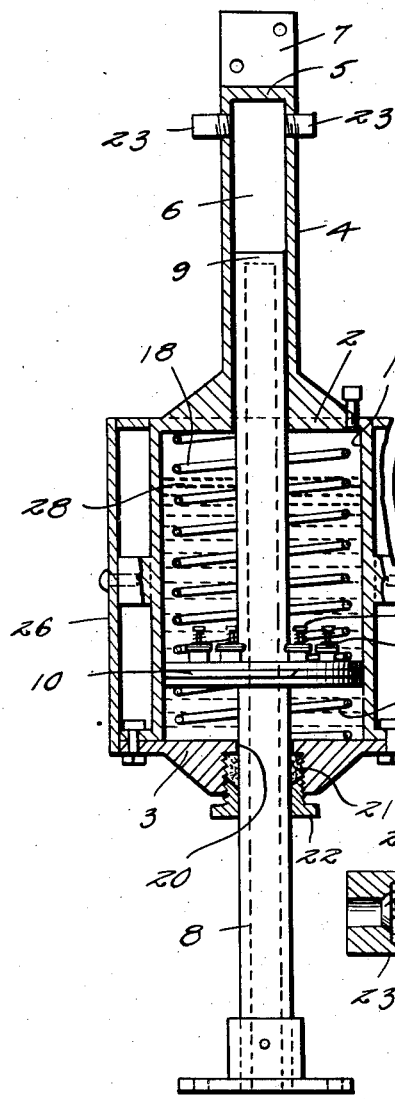
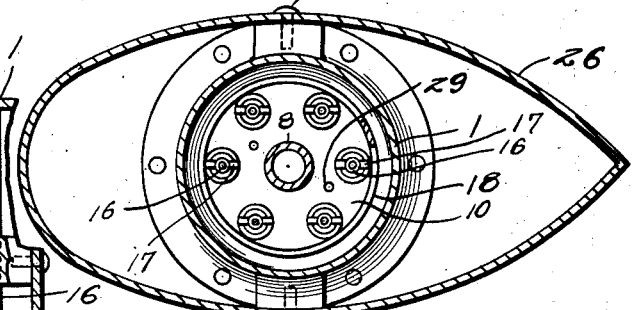
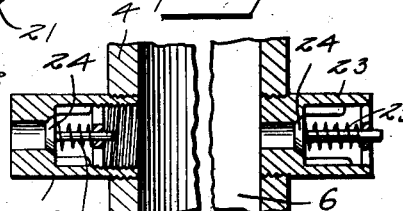
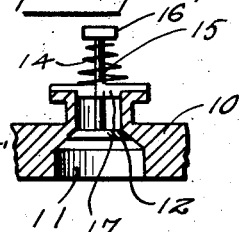
Inventor
G. F. Bischof
By Watson E. Coleman Patented Dec. 29, 1931

1,838,802

UNITED STATES PATENT OFFICE

GEORGE F. BISCHOF, OF FORT WORTH, TEXAS

SHOCK ABSORBER

Application filed April 25, 1929. Serial No. 358,066.

This invention relates to a shock absorber and has relation more particularly to a device of this kind adapted for use in connection with an aeroplane and which serves effectually to retard bounding of the aeroplane in landing and which is also designed in a manner to compensate for lack of weight in the landing gear to bring the parts of the device in normal or original position.

The invention also has for an object to provide a device of this kind constructed in a manner to eliminate weight yet acting effectively and whereby the device is designed to eliminate air resistance, quick access to parts for repair and which operates for the betterment and safety of passengers.

Another object of the invention is to provide a device of this kind embodying means whereby air and liquid are employed to function therewith but each of said fluids being under control, the air being controlled to give ease of first contact and the fluid controlled to gradually increase the effectiveness of both the air and liquid.

The invention consists in the details of construction and in the combination and arrangement of the several parts of my improved shock absorber whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation of a shock absorber constructed in accordance with an embodiment of my inevntion;

Figure 2 is an enlarged view partly in section and partly in elevation, the section being taken substantially on the line 2—2 of Figure 1;

Figure 3 is a sectional view taken substantially on the line 3—3 of Figure 1;

Figure 4 is an enlarged fragmentary view partly in section and partly in elevation illustrating one of the valves herein disclosed for use in connection with the piston;

Figure 5 is an enlarged fragmentary sectional view illustrating in detail the air vents and valves associated with the air chamber.

As disclosed in the accompanying drawings, 1 denotes a cylinder of desired size having one end closed by the fixed head 2 and its opposite end portion closed by the removable head 3. The head 2 at its axial center is provided with an elongated tubular extension 4, the outer end 5 of which being closed and the bore 6 thereof being continued through the head 2.

The outer end portion of the extension 4 is provided with the spaced ears 7 or other desired means whereby said outer end portion of the extension 4 may be operatively connected with the fuselage or other desired structure of an aeroplane.

Extending axially of the cylinder 1 and slidably disposed through the heads 2 and 3 thereof is an elongated plunger 8 the same being of a length whereby the upper portion of said plunger 8 of the assembly at all times is positioned with the bore 6 of the extension 4. This plunger 8 is preferably a metal tube having its upper end 9 closed so that the portion of the bore 6 above said closed end 9 serves as an air chamber for a purpose to be hereinafter more particularly referred to.

The opposite or lower end portion of the plunger 8 is adapted to be operatively engaged with the running gear of an aeroplane, as for example the axle thereof. Fixed to the plunger 8 at a desired point thereon and within the cylinder 1 is a high compression piston 10 having disposed therethrough a plurality of circumferentially disposed openings, each of said openings 11 having associated therewith a downwardly opening check valve 12 normally maintained closed by an expansible spring 14 encircling the stem 15 of the valve 12 and interposed between an enlargement 16 carried by the stem and the cross member 17 operatively supported by the piston 10 and disposed across the opening 11.

Interposed between the piston 10 and the head 2 of the cylinder 1 is a rebound spring 18 of desired tension and herein disclosed as encircling the plunger 8. Interposed between the head 3 of the cylinder 1 and the piston 10 and also encircling the plunger 8 is a spring support 19 of desired tension. The opening 20 of the head 3 through which the plunger 8 is directed has its outer portion enlarged to receive the packing 21. Threaded within said enlarged portion of the opening 20 is a packing nut 22 through which the plunger is also directed. This nut 22 is adapted to be adjusted to take up and tighten the packing 21 as desired. In communication with the upper portion of the bore 6 of the extension 4 at diametrically opposed points and also with the atmosphere are the nipples 23, in one of which is arranged an inwardly opening check valve 24 normally maintained closed through the instrumentality of an expansible spring 25, while the second nipple 23 has arranged therein an outwardly opening check valve 24' normally closed by a spring 25'. By varying the tension of the springs 25 and 25' the action of the valves 24 and 24' can be readily regulated as desired.

Suitably fixed to the cylinder 1 and substantially concealing the same is a false housing or casing 26 stream line to the wind. This housing or casing 26 is preferably made of sheet metal and riveted, as at 27, in desired applied position with respect to the cylinder 1. The purpose of this housing or casing is to make the flow of air easier when the aeroplane is in flight than would be the case with the cylinder 1 free and unobstructed.

In making a landing the first contact of the landing gear, the resistance offered to the piston 10 by the liquid 28 within the cylinder 1 will check or retard bounding and which action is further facilitated by the spring 18. This spring 18 is of a tension to carry its portion of the load of the aeroplane and to keep the piston 10 normally at its lower position when the aeroplane is at rest. It is to be stated at this time that the spring 19 is of a tension to support the suspended weight of those parts attached to the plunger 8. The upward movement of the piston 10 within the cylinder 1 is facilitated by the opening of the valves 12 while the opposite relative movements of the cylinder 1 and piston 10 are effectively retarded by the unobstructed and relatively minute openings 29 disposed through the piston 10 and which may be of any number preferred.

As the plunger 8 moves upwardly compression of the air within the bore 6 above the closed end 9 of the plunger 8 serves to give ease of first contact while the liquid 28 in its association with the piston 10 serves to gradually increase the effectiveness of the retarding action of both the air and liquid.

From the foregoing description it is thought to be obvious that a shock absorber constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A shock absorber of the character described, comprising a hydraulic chamber, an air chamber secured to one end of said hydraulic chamber and coaxial therewith, a plunger slidably mounted in said air chamber and extending through and outwardly of the other end of said hydraulic chamber, a grooved piston secured to said plunger and slidably engaging said hydraulic chamber, a piston ring mounted in the grooved portion of said piston, an inlet and an outlet port for said air chamber, check valves for each of said ports, said ports opening at one side into the atmosphere, said piston having a plurality of bleeder openings therethrough, bleeder check valves in certain of said bleeder openings limiting the flow of liquid in one direction, a supporting spring in said hydraulic chamber and contacting with one side of said piston, a rebound spring, and an outer casing positioned about said hydraulic chamber, said outer casing having a restricted forward edge whereby to reduce the friction of said casing upon forward movement thereof.

In testimony whereof I hereunto affix my signature.

GEORGE F. BISCHOF.